Aug. 18, 1925.  1,549,851
R. C. BENNER
HERMETICALLY SEALED DRY CELL
Filed Jan. 29, 1921
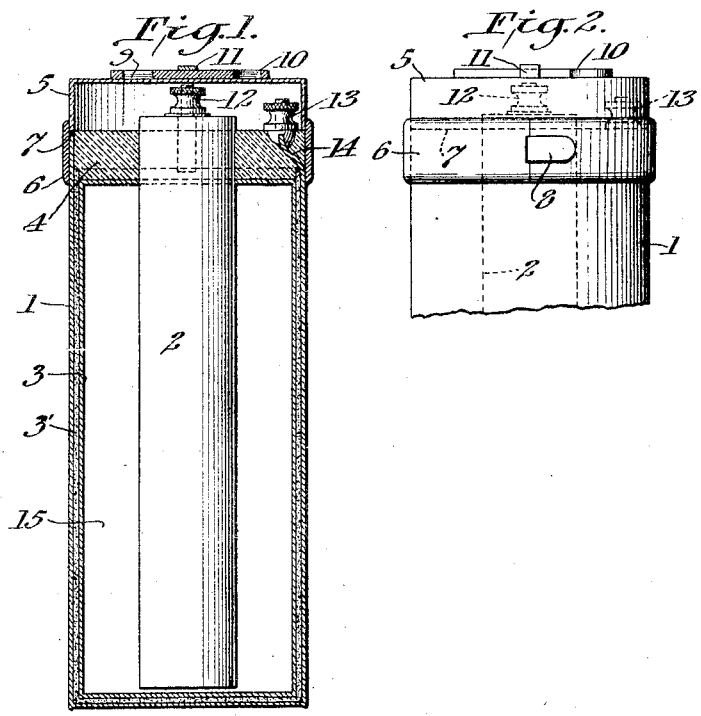
Inventor:
Raymond C Benner, Patented Aug. 18, 1925.

1,549,851

UNITED STATES PATENT OFFICE.

RAYMOND C. BENNER, OF FREMONT, OHIO, ASSIGNOR TO NATIONAL CARBON COMPANY, INC., A CORPORATION OF NEW YORK.

HERMETICALLY-SEALED DRY CELL.

Application filed January 29, 1921. Serial No. 441,032.

*To all whom it may concern:*

Be it known that I, RAYMOND C. BENNER, a citizen of the United States, residing at Fremont, in the county of Sandusky and State of Ohio, have invented certain new and useful Improvements in Hermetically-Sealed Dry Cells, of which the following is a specification.

It is generally accepted that the deterioration which dry cells undergo during the period before they are put into use, or while they are "on the shelf" is in part due to the fact that the seal with which such cells are provided does not produce a gas-tight closure. The minute crevices between the seal and the zinc permit the slow evaporation of moisture from the cell and such loss of moisture eventually affects the action of the cell adversely. The crevices probably also permit the entrance of air into the cell, and air tends to depolarize the local action which is always present. Absolutely pure zinc is not commercially available for battery manufacture and the zinc which is used contains impurities which are more or less localized. Electrochemical action between pure zinc and impurities is set up in the presence of electrolyte. Such action is limited by the polarization of the couples so formed, and it will be apparent that anything which can serve to prevent such polarization will promote local action and accelerate the deterioration of the battery. Air, entering around the seal, is believed to be capable of depolarizing the local action.

The expedient of hermetically sealing the cells has been proposed but has not been adopted. Local action occurs in dry cells to some extent, even if air is excluded, and gas is generated in the cell thereby. Furthermore, it is known that the depolarizing mix evolves gases. Whether this is due to the decomposition of substances like carbonates, or to local action due to impurities in the mix, or to other causes, it can be shown that considerable volumes of gases are evolved. Under these conditions an hermetical sealing of a dry cell is not feasible as the evolved gases accumulate under pressure in the cell and eventually bulge and rupture the seal or zinc cup.

The object of my invention is to provide a method of procedure which will permit of the hermetical sealing of dry cells so as to obtain the advantages due to such sealing while avoiding the disadvantages.

I attain the above object by applying an hermetical seal to dry cells in which the evolution of gases within the cell, while in inactive condition, is either prevented or reduced to a harmless degree.

The evolution of gases due to local action at the zinc may be eliminated by applying to that portion of the zinc which is intended to come into contact with the electrolyte a coating of protective substance adapted to be removed when it is desired to render the cell active. Paraffin or other low melting solid or semi-solid water-proof material may be used for this purpose, and may be removed when desired by melting it, as by placing the cell in hot water. The molten material will flow off the zinc exposing the latter to the action of the electrolyte.

Evolution of gases from the depolarizing mix may be prevented in any suitable way. The following are given as examples, but it will be understood that any method or combination of methods having the desired result may be substituted for or used in conjunction with those specifically enumerated.

The mix may be made up and allowed to age until evolution of gas therefrom has ceased. Any of the materials of the mix which might contain carbonates or other gas evolving substances may be treated with dilute acid to decompose such substances. Barium chloride or other gassing-inhibiting material may be added to the mix as proposed in the patent application of Anna A. MacKenzie Ser. No. 421,744, filed November 4, 1920.

The hermetical sealing of the cell may be accomplished in any known or suitable way wherein the seal may be broken when it is desired to render the cell active. I prefer a combination of seals, one being absolutely air tight and being adapted for removal upon activation of the cell and another seal being adapted to remain on the cell during service, and being sufficiently pervious to permit the escape of gases generated by the action of the cell yet tight enough to prevent undue evaporation of moisture from the cell after activation. The following arrangement of seals has been found satisfactory and is given by way of example. A dry cell having the usual pitch seal is provided with an abutting cap of the same diameter at its upper end. The edge of this cap meets the top of the zinc cup, but the cap is out of contact with the carbon. The joint between the cap and the zinc is made air-tight by removable sealing means as by soldering a strip of metal around the joint in such a way that it can be removed. Either the strip or the cap may be provided with a projecting tongue of metal adapted to be seized in a suitable key and rolled up, the metal being torn along the lines of the sides of the tongue extended, this method being well known in the art of sealing goods in metal containers and forming no part of my invention. Other forms of hermetical seal will readily suggest themselves.

A cell constructed in accordance with my invention is shown in the attached drawing wherein Fig. 1 is a vertical longitudinal section and Fig. 2 is fragmental side elevation, showing the removable sealing cap.

In the drawings, 1 denotes a zinc can of the kind usually employed for dry cells, 2 a carbon electrode and 3 a lining of pulp board or similar absorbent material. For the purposes pointed out above, I interpose a coating of paraffin or any other easily fusible water-proof material 3' between the zinc can and the lining. This coating is represented as of considerable thickness, for clearness in illustration, but it will be understood that a relatively thin continuous layer will suffice to prevent contact of the electrolyte and zinc.

Reference numeral 4 indicates a seal of pitch or the like, which closes the major part of the top of the can but does not provide an hermetic seal. To secure the latter, a cap 5, abutting upon the upper end of the wall of the zinc can 1, is provided. A band 6 encircles the can and the cap and overlies their junction 7. The band 6 may be attached in any manner which will give a secure and air-tight joint, as, for example, by soldering. A tongue 8 is provided on the band 6, which tongue is adapted to be passed through the opening 9 in key 10. A clip 11 holds the key upon the top of the cell.

The cell is shown as having the binding post 12 positioned upon the electrode 2 in the usual manner. The binding post 13, however, is affixed to a depressed portion 14 of zinc can 1, so that the post may not interfere with the positioning of cap 5. The space 15 about electrode 2 is filled with a mix, such as described, which is substantially non-gassing on open circuit.

It will be clear from the foregoing description that a cell prepared according to my invention may be stored without danger of deterioration and may be activated with facility when desired for use.

I claim:

1. A dry cell comprising an hermetic seal, and means in contact with an active material of said cell and inhibiting the production of gas.

2. The invention according to claim 1, in which the hermetic seal is removable.

3. An hermetically sealed dry cell, comprising a mix substantially free from substances capable of evolving gases by reaction with cell constituents.

4. An hermetically sealed dry cell, comprising a mix having non-gassing characteristics such as may be obtained by aging the mix before incorporation in the cell.

5. An hermetically sealed dry cell, comprising a mix associated with a material capable of inhibiting production of gas.

6. An hermetically sealed dry cell, comprising a mix associated with an alkaline earth metal chlorid.

7. An hermetically sealed dry cell, comprising a mix substantially free from substances capable of evolving gas by reaction with cell constituents, and a zinc electrode provided with a protective coating.

8. An hermetically sealed dry cell non-gassing on open circuit, comprising a mix substantially free from substances capable of evolving gas by reaction with the cell constituents, and a zinc electrode provided with an easily fusible protective coating.

In testimony whereof I affix my signature.

RAYMOND C. BENNER.